3,110,604
PAVING COMPOSITION AND METHOD OF
MAKING IT
Kenneth E. McConnaughay, P.O. Box 871,
Lafayette, Ind.
No Drawing. Filed June 17, 1960, Ser. No. 36,735
5 Claims. (Cl. 106—277)

This invention relates to paving compositions formed from mixtures of aggregate and bituminous emulsions.

One of the problems frequently encountered in bituminous emulsion type pavements is the proper control of the viscosity of the emulsion. If the viscosity is too low, the emulsion will run off of the aggregate, and thus fail to bind the aggregate into the paved surface. Similarly, if the viscosity of the emulsion is too high, the emulsion will not properly flow around the aggregate, and will thus fail to produce a uniform mixture of the aggregate and emulsion, also resulting in the aggregate not being properly held in the paved surface. Although great care may be exercised in controlling the viscosity of the emulsion as it is prepared, the condition of the aggregate with respect to its wetness or dryness will influence the viscosity of the emulsion as it is mixed with said aggregate. For example, a relatively wet aggregate, may, when mixed with the bituminous emulsion, sufficiently lower the viscosity of said emulsion to cause it to run off of the aggregate. Further, the stability of such bituminous emulsions varies with the type of emulsifiers employed. Many such emulsifiers which are in common use do not produce a stable emulsion when mixed with the bituminous material, or bitumen. Consequently, the bitumen will settle out of the emulsion, and will thus produce an inferior pavement when mixed with aggregate.

It is therefore an object of this invention to provide a paving composition in which the bituminous emulsion will have a controlled viscosity, and in which said emulsion will have a relatively high stability.

In producing a bituminous emulsion, the bituminous material employed may vary widely, and may be pure asphalt, a mixture of asphalts, cut-back asphalt, tar, or tar-asphalt combinations, or combinations of these materials with synthetic or natural rubbers, or other hydrocarbons.

The emulsifying agent may also vary, but for simplicity or description, I will describe a bituminous emulsion made from pure asphalt and tall oil soap used as an emulsifying agent. In producing such an emulsion, the asphalt may be heated to decrease its viscosity and mixed with tall oil, and the resulting mixture passed through a dispersing mill together with a hot water solution of an alkali such as caustic soda or caustic potash. The alkali saponifies the tall oil to form a soap serving as an emulsifying agent promoting the dispersion of the asphalt in the water. Alternatively, the tall oil can be saponified with an aqueous solution of alkali and the resulting soap solution added to the asphalt. One specific example of such an emulsion is as follows:

| | Percent |
|---|---|
| Asphalt of 150 penetration (A.S.T.M. Specification D-5-25) | 60.0 |
| Crude tall oil | 1.8 |
| Caustic soda | 0.25 |
| Water | 37.95 |

This emulsion and the method of making it are the subject matter of my previously issued Patent No. 2,855,319, issued October 7, 1958, and are merely set forth herein for purposes of illustration.

In laying a pavement using such emulsion the emulsion may be applied to the aggregate and the coated aggregate then spread and compacted, or the aggregate may be spread prior to the application of the emulsion to it. Thus, even though the viscosity of the emulsion be known, the viscosity of the mixture of the aggregate and emulsion will vary with the moisture content of the aggregate. Further, the properties of the emulsion may change with time so that it is possible that between the time of preparing the emulsion and the time of mixing it with the aggregate some of the bitumen may have settled out to thus reduce the over-all binding effect of the emulsion on the aggregate.

Thus, to overcome these problems, I incorporate into the paving composition a material exercising the property of dilatancy. Such a property is the characteristic of a material to thicken and become more viscous with movement. Such thickening may be produced by stirring, agitation, or merely causing the material to flow. An emulsion possessing this property of dilatancy becomes more viscous upon mixing, and will possess increased viscosity even though water be added to the emulsion or to the mixture of the emulsion and the aggregate. I have discovered that such a dilatant material can be used to control the viscosity of the emulsion, and serves as a stabilizing agent for the emulsion, and as an extender for the emulsifier. Further, such a dilatant material can be used with cationic, anionic, and nonionic emulsions.

The dilatant material which I employ in my paving composition are water soluble poly ethylene oxide polymers having a reduced viscosity from about 1 to about 60 and higher which correspond to estimated molecular weights from at least 20,000 to several hundred thousand and higher. Polymers with reduced viscosities from about 1 to about 30 are preferred. As is known, reduced viscosity, a value obtained by dividing the specific viscosity by the concentration of the polymer in the solution, the concentration being measured in grams of polymer per 100 ml. of solvent, is regarded as a measure of molecular weight. The specific viscosity is obtained by dividing the difference between the viscosity of the solution and the viscosity of the solvent by the viscosity of the solvent. The reduced viscosities referred to are measured at a concentration of 0.2 gram of polymer in 100 ml. of acetonitrile at 30° C. Such polymers are sold under the trademark of "Polyox."

It is most desirable in producing a bituminous emulsion with a controlled viscosity to add the polymer to the emulsion after it is discharged from the dispersing mill, and to add said polymer to the emulsion with a small amount of agitation so that it will not cause the emulsion to become too viscous. When the polymer is added at this stage in the processing, it controls the viscosity of the emulsion and further enhances the emulsion's stability to reduce the susceptibility of the bitumen to settling out. Alternatively, the polymer can be added to the emulsifying agent prior to its introduction into the dispersing mill with the bitumen. While the polymer normally produces an increase in viscosity with agitation, the shearing forces in the dispersing mill are sufficient to break up the polymer to reduce or destroy its dilatant property, depending upon the shear forces developed in the mill. In such a situation, the polymer will still stabilize the emulsion to reduce settling out and will further serve as an extender for the emulsifying agent. The polymer may also be added to the aggregate-emulsion mixture may also be added to the aggregate-emulsion mixture at the time said mixture is being prepared. If the mixture is quite fluid, a small addition of the polymer to the mixture will increase its viscosity and thus produce a smooth mixture of the desired consistency. Thus, it can be seen that the polymer exercises its maximum dilatancy for thickening the emulsion when it is added to the already prepared emulsion with reduced or carefully controlled agitation. And if such dilatancy becomes too great to thus cause the emulsion to become too viscous, the viscosity of the emulsion can be easily reduced by subjecting the treated emulsion to severe agitation, pumping, or milling.

The quantity of the poly ethylene oxide polymer added to the emulsion will of course depend upon the initial viscosity of the emulsion and the moisture content of the aggregate with which the emulsion is to be mixed. I have achieved excellent viscosity control by adding the polymer to either the emulsion or the aggregate-emulsion mixture at the rate of from about 2 pounds to about 60 pounds of polymer per 10,000 gallons of emulsion. Where larger quantities of the polymer are added, the bitumen content of the emulsion may be proportionately reduced.

As a general average result if 6 pounds of polymer is added to 10,000 gallons of emulsion about 2%–4% less bitumen may be used to obtain the same viscosity. Thus, if a 68% bitumen content emulsion has a viscosity of 240 sec. at 122° F., the same viscosity will be reached with a 64%–66% bitumen content if the polymer is added as described above. If double the amount of polymer is added, the bitumen may be reduced to as low as 62% with the same resulting viscosity.

The same type of results may be obtained when the polymer is added to the aggregate before it is mixed with an emulsion. Because the polymer is added to the aggregate in such small quantities it is desirable to employ a carrier material to insure a uniform distribution throughout the aggregate. The polymer may be added in the form of a slurry comprised of the polymer and an oil based carrier. For example, I have achieved excellent results forming such a slurry using one part of polymer to three parts of fuel oil, or equal parts of polymer and light tar or cut back asphalt. Alternatively, the polymer may be added to the aggregate in a dry state using an inert filler as a carrier. Examples of such fillers are limestone dust, asbestos, silica dust, and the like. The polymer is added to such carrier at the rate, for example, of one part polymer to three to six parts carrier.

The polymer is added to either the liquid or dry carrier in an amount such that from about 0.1 pound to about 2 pounds of polymer will be mixed with one ton of aggregate. Where the polymer is mixed with a dry carrier, i.e. limestone dust, no control of the mixing is necessary. However, where it is mixed with a liquid carrier, i.e. fuel oil, to produce a slurry, the mixing should be carefully controlled to prevent the polymer from increasing the viscosity of scurry beyond the desired value.

I claim as my invention:

1. A paving composition, consisting essentially of a mixture of aggregate, an aqueous bituminous emulsion, and a water soluble polymer of poly ethylene oxide having a molecular weight in the range of from about 20,000 to several hundred thousand distributed throughout said mixture, said polymer being present in an amount of from about 2 pounds to about 60 pounds per 10,000 gallons of emulsion.

2. A method of making a paving composition of a mixture of aggregate and a bituminous emulsion, comprising the steps of adding said emulsion to the aggregate to form a coating of emulsion on said aggregate, and dispersing a water soluble polymer of poly ethylene oxide having a molecular weight in excess of 20,000 throughout said emulsion prior to its addition to the aggregate, said polymer being dispersed in the emulsion in amount of from about 2 pounds to about 60 pounds per 10,000 gallons of emulsion.

3. A method of making a paving composition of a mixture of aggregate and a bituminous emulsion, comprising the steps of adding said emulsion to the aggregate to form a coating of emulsion on said aggregate, and uniformly distributing a water soluble polymer of poly ethylene oxide having a molecular weight of from about 20,000 to several hundred thousand throughout said aggregate prior to its addition to the emulsion, said polymer being distributed throughout the aggregate in an amount of from about .1 pound to about 2 pounds per ton of aggregate.

4. A method of making a paving composition as set forth in claim 3 in which said polymer of ethylene oxide is added to an oil based carrier to form a slurry and said slurry is uniformly distributed throughout said aggregate.

5. A method of making a paving composition as set forth in claim 3 in which said polymer of ethylene oxide is added to an inert filler and said filler and polymer are uniformly distributed in a dry state throughout said aggregate.

References Cited in the file of this patent

UNITED STATES PATENTS

| | | |
|---|---|---|
| 1,930,853 | Kolleck et al. | Oct. 17, 1933 |
| 2,870,101 | Stewart | Jan. 20, 1959 |

OTHER REFERENCES

Abraham: Asphalts and Allied Substances, volume 1, 5th Ed., 1945, D. Van Nostrand Co., N.Y., pp. 559–564.